(12) United States Patent
Okuyama et al.

(10) Patent No.: US 6,646,404 B2
(45) Date of Patent: Nov. 11, 2003

(54) METHOD FOR CONTROLLING ROBOT AND ROBOT CONTROLLER USING THE METHOD

(75) Inventors: Masayuki Okuyama, Suwa (JP); Takayuki Kameyama, Chiba (JP); Nobuyuki Setsuda, Chiba (JP)

(73) Assignees: Seiko Epson Corporation, Tokyo (JP); Seiko Instruments, Inc., Chiba-ken (JP)

( * ) Notice: Subject to any disclaimer, the term of this patent is extended or adjusted under 35 U.S.C. 154(b) by 0 days.

(21) Appl. No.: 10/026,057

(22) Filed: Dec. 21, 2001

(65) Prior Publication Data
US 2002/0105296 A1 Aug. 8, 2002

(30) Foreign Application Priority Data

Dec. 25, 2000 (JP) ........................................ 2000-392392

(51) Int. Cl.[7] ................................................. B25J 9/22
(52) U.S. Cl. .......................... 318/568.13; 318/568.16; 318/568.19; 901/42; 901/43; 700/282
(58) Field of Search ....................... 318/568.16, 568.19, 318/568.13; 901/42, 43; 700/262

(56) References Cited

U.S. PATENT DOCUMENTS

| 4,458,321 A | * | 7/1984 | Whitney et al. ............. 700/258 |
| 4,701,686 A | | 10/1987 | Kishi et al. ................. 318/632 |
| 4,876,728 A | | 10/1989 | Roth ............................ 382/21 |
| 4,954,762 A | * | 9/1990 | Miyake et al. ......... 318/568.19 |
| 5,237,801 A | | 8/1993 | Hillam et al. ................. 53/446 |
| 5,568,593 A | | 10/1996 | Demarest et al. ............. 395/82 |
| 5,727,132 A | * | 3/1998 | Arimatsu et al. ........... 700/259 |
| 5,807,449 A | * | 9/1998 | Hooker et al. ................. 156/64 |
| 5,969,339 A | | 10/1999 | McMurray et al. ..... 250/223 R |

FOREIGN PATENT DOCUMENTS

| JP | 60-221805 | 11/1985 |
| JP | 08-336783 | 12/1996 |
| JP | 08-336784 | 12/1996 |
| JP | 09-131683 | 5/1997 |
| JP | 10-083207 | 3/1998 |

* cited by examiner

Primary Examiner—Rita Leykin
(74) Attorney, Agent, or Firm—Mark P. Watson

(57) ABSTRACT

The current position of a work is sequentially updated in a conveyor coordinate system, and the path of a robot to follow the work is formed by transforming the position of the work from the conveyor coordinate system to a robot coordinate system.

26 Claims, 15 Drawing Sheets

CONVEYOR MOVEMENT DIRECTION

F I G. 9
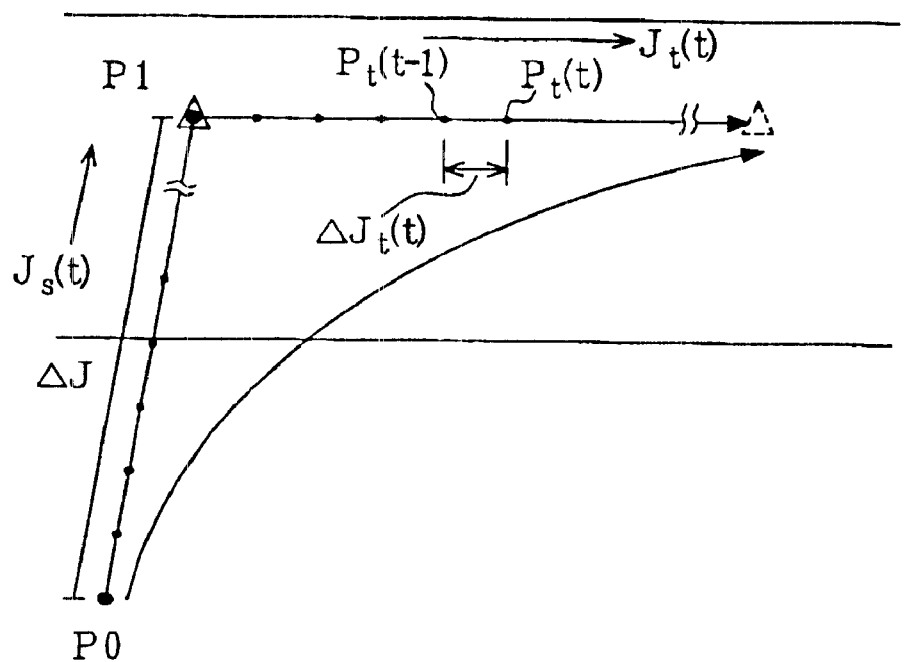

CONVEYOR MOVEMENT DIRECTION

FIG. 20

```
FUNCTION MAIN
   DO
      IF ( workpos.x >= 100 ) AND ( workpos.x <= 200 )
         AND ( workpos.y >= 300 ) AND ( workpos.y <= 400 ) THEN    }─S101
         JUMP workpos ─S102
      eflag = 0
      hflag = 0
      REPEAT
         TRACK ON
         IF ( nowpos.x >= 100 ) AND ( nowpos.x <= 200 )
            AND ( nowpos.y >= 300 ) AND ( nowpos.y <= 400 ) THEN   }─S103
            eflag = 0
         ELSE
            eflag = 1; hflag = 1
         ENDIF
         IF HANDLING = 1 THEN hflag = 1 ─S104
      UNTIL hflag = 1
      TRACK OFF
      IF eflag = 1 THEN HANDLE ERROR ─S105
   LOOP
END
```

METHOD FOR CONTROLLING ROBOT AND ROBOT CONTROLLER USING THE METHOD

BACKGROUND OF THE INVENTION

1. Field of the Invention

The present invention relates to a method for controlling a robot which follows a moving object which is conveyed on a conveyor or the like and which performs a predetermined action on the moving object. The present invention also relates to a robot controller using the method.

2. Description of the Related Art

Hitherto, in conveyor tracking in which such a moving object (hereinafter referred to as a "work") is followed, an external sensor such as a proximity switch determines as to whether the work has come into a region in which a robot can move, and the robot starts to follow the work at its finger tip (tool) in accordance with a determination signal and performs an action on the work when the hands reach the work. The known conveyor tracking has been applied mainly to welding of automotive bodies disposed on a conveyor. The known system of conveyor tracking has been formed such that the conveyor moves at a low speed and a small number of the works (generally one work) is processed at one time.

Recently, various applications have required conveyor tracking, and a processing of a plurality of the works have been required while they are conveyed on a conveyor at a certain level of speed. However, it has been difficult to realize applications by using a system such as that described above in which a small number of works are processed.

When the positions of the works change, a certain amount of computation in proportion to the number of works is necessary. Therefore, for example, when the robot is positioned so as to be inclined with respect to the conveyor instead of being parallel thereto, the current positions of the works must be computed by performing trigonometric computations based on the angle of inclination of the robot with respect to the amount of movement of the conveyor. Thereby, the amount of the computation becomes significantly increased because it is necessary to compute an x-coordinate value and a y-coordinate value in a robot coordinate system (a rectangular coordinate system (x, y, and z) in which the z-axis is a vertical axis having the origin at a mounting base of the robot). Therefore, there is a problem in that the number of works which can be processed at one time is limited, a high-speed CPU for processing numbers of the works is required, and so on.

In an operation program for the robot to follow the works on a conveyor, a targeted position of the tool of the robot is set in the robot coordinate system. Therefore, it is difficult to designate the position based on the conveyor (for example, to designate a position 5 mm upstream from the center of a work or a position 10 mm upward in the width direction of the conveyor from the center of the work), and therefore, the description of the program becomes complex.

Recently, a system which uses a camera for detecting the works has been known. It is expected that the system can be used when a plurality of the works are scattered on a conveyor because the camera can determine the positions and orientation of the works. However, the problem of the large amount of computation for updating the present positions of the works has not been overcome even in such a system.

In these known systems, the users must program processes for checking whether a work is positioned in an operational range of the robot or out of the operational range. Therefore, a process loop for monitoring whether or not the current position of the work is in the operational range must be described in the user program.

FIG. 20 shows an example of the description of a user program. FIG. 21 is a flowchart corresponding to the user program shown in FIG. 20. The same reference numerals are used for corresponding steps in FIGS. 20 and 21.

In this user program, it is checked by a process loop (DO . . . LOOP) whether or not the work is positioned in an operational range (step S101), and when the work is positioned in the operational range, a following path is formed and the robot follows the work (step S102). The following path is repeatedly formed until completion of handling of the work (step S104), while a process loop (REPEAT . . . UNTIL) checks whether or not the work moves outside of the operational range (step S103). When the robot moves outside of the operational range, the following motion is suspended and an error process is performed (step S105).

In the known technology, since it is checked, based on a user program, whether or not the work arrives in the operational range (handling region) of the robot, laborious work such as program creation is required of the user, and the program becomes complex thus less readable.

When the program is suspended for any reason while the robot is performing the following motion, there is a risk of the robot colliding against other devices disposed in the operational range of the robot or an error is caused by the robot trying to operate beyond its operational range.

A robot controller which controls a plurality of devices such as a camera and a robot is provided with a multi-tasking ability to perform at a high speed a parallel processing of a plurality of programs such as a program concerning determination of the position of the work and an operational program of the robot. However, some processes such as checking for arrival and deviation of the work which may enough function even by a simple checking at given intervals are processed excessively due to the process loops, whereby the operational speed of the other programs is decreased and the performance of the robot controller as a whole is lowered, that is, the multi-tasking ability is not used efficiently.

The known handling system generally includes a straight conveyor, and it is difficult to control motion to follow the works conveyed on a conveyor which has a curved conveying pathway for the works, such as a turntable or an arc-shaped conveyor. A technology is disclosed in, for example, Japanese Unexamined Patent Application Publication No. 60-221805, which overcomes this drawback. However, the drawback of the large amount of computation required for determining the position of the work has not been solved.

SUMMARY OF THE INVENTION

Accordingly, it is an object of the present invention to provide a method for controlling a robot and a robot controller using the method in which the amount of computation for determining the present position of a work conveyed on a conveyor is decreased regardless of a moving path, a robot operation on a moving object can be described easily, and intuitive teaching is made possible.

It is another object of the present invention to provide a method for controlling a robot and a robot controller using the method in which a program can be described easily and the execution speed of the program can be increased by setting a handling region (following region) of the robot and by providing a function to check the relationship of the positions between the following region and the work.

(1) According to one aspect of the present invention, a method for controlling a robot, which follows a moving object conveyed by a conveyor and which performs a predetermined action on the moving object, is provided. The method comprises the steps of detecting the moving object; obtaining a detected position of the moving object in a conveyor coordinate system from the result of the detection; sequentially updating a current position of the moving object in the conveyor coordinate system on the basis of the detected position of the moving object and the amount of movement of the conveyor; transforming the current position of the moving object in the conveyor coordinate system to that in a robot coordinate system; and forming a following path for the robot to follow the moving object, on the basis of the transformed position.

(2) In the method for controlling a robot according to the present invention, the conveyor coordinate system may consist of an x-axis in the movement direction of the moving object, a y-axis which represents, together with the x-axis, a carrying surface of the conveyor, and a z-axis perpendicular to the x-axis and the y-axis.

(3) The method for controlling a robot according to the present invention may further comprise the step of making the robot start a following motion according to a motion command to follow the moving object at a position designated by designated-position data included in the motion command, provided that the designated position data are set in the conveyor coordinate system.

(4) The method for controlling a robot according to the present invention may further comprise the steps of setting a following region in the conveyor coordinate system; determining, on the basis of the following region and a current position of the moving object, whether or not the moving object is positioned in the following region; generating a moving-object-arrival event when determining that the moving object is positioned in the following region; and making the robot start a following motion according to a motion command to follow the moving object at a position designated by designated-position data included in the motion command, when the moving-object-arrival event is generated.

(5) In the method for controlling a robot, according to the present invention, it may be determined at a given frequency whether or not the moving object is positioned in the following region.

(6) In the method for controlling a robot, according to the present invention, the following region may be defined by two first lines parallel to the movement direction of the moving object and two second lines perpendicular to the first lines, on a carrying surface of the conveyor.

(7) In the method for controlling a robot, according to the present invention, the following path for the robot to follow the moving object may be formed by adding an additional path in the movement direction of the moving object to a direct path of a tool of the robot in a direction toward a starting position, where the moving object is positioned at the start of the following motion, wherein the additional path is obtained by transforming change of the position of the moving object in the conveyor coordinate system to that in the robot coordinate system and further to that in a robot joint-angle coordinate system, and the direct path is obtained by transforming positions of the tool of the robot and the moving object at the start of the following motion, respectively in the robot coordinate system and the conveyor coordinate system, to those in the joint-angle coordinate system.

(8) The method for controlling a robot according to the present invention may further comprise the steps of generating a following-motion-suspension event when it is determined that the moving object is not in the following region; and performing a process in response to the following-motion-suspension event.

(9) In the method for controlling a robot, according to the present invention, the process in response to the following-motion-suspension event may be a process to suspend the formation of the additional path.

(10) The method for controlling a robot according to the present invention may further comprise the steps of suspending the formation of the additional path according to a motion command including designated-position data, provided that the designated position data are set in the robot coordinate system; and forming the following path by the direct path in a direction toward a position designated by the designated position data.

(11) In the method for controlling a robot, according to the present invention, one conveyor coordinate system may be provided for each of a plurality of the conveyors.

(12) In the method for controlling a robot, according to the present invention, the conveyor coordinate system and the following region may be provided for each of a plurality of the robots.

(13) In the method for controlling a robot, according to the present invention, the conveyor may comprise a straight conveyor.

(14) In the method for controlling a robot, according to the present invention, the conveyor may comprise either an arc-shaped conveyor or a turntable, and the coordinate system of the conveyor may comprise an x-coordinate represented by a rotation angle, a z-coordinate represented by an axis of the rotation of the conveyor, and a y-coordinate represented by a distance from the axis of the rotation.

(15) According to another aspect of the present invention, a robot controller for controlling a robot which follows a moving object conveyed by a conveyor and which performs a predetermined action on the moving object comprises a moving-object-current-position-storing section for storing a current position of the moving object; a detector for detecting the moving object; a moving-object-current-position-updating section for obtaining the position of the moving object in a conveyor coordinate system from the result of the detection by the detector, computing a current position of the moving object on the basis of the detected position of the moving object and the amount of movement of the conveyor, and updating the moving-object-current-position-storing section with the computed data; and a path-forming section for transforming the current position of the moving object in the conveyor coordinate system stored in the moving-object-current-position-storing section to that in a robot coordinate system, and forming a following path for the robot to follow the moving object, on the basis of the transformed position.

(16) In the robot controller according to the present invention, the conveyor coordinate system may consist of an x-axis in the movement direction of the moving object, a y-axis which represents, together with the x-axis, a carrying surface of the conveyor, and a z-axis perpendicular to the x-axis and the y-axis.

(17) The robot controller according to the present invention may further comprise a user-program-executing section which executes a user program described with a motion command and which determines whether or not designated-position data included in the motion command are described in the conveyor coordinate system. The path-forming section may form a following path for the robot to follow the moving object at a position designated by the designated-position data included in the motion command, when the user-program-executing section determines that the designated-position data are described in the conveyor coordinate system.

(18) The robot controller according to the present invention may further comprise a following-region-storing section for storing a following region represented by coordinates in the conveyor coordinate system; and an event-detecting section which determines, on the basis of the current position of the moving object stored in the moving-object-current-position-storing section and the following-region stored in the following-region-storing section, whether or not the moving object is positioned in the following region, which generates a moving-object-arrival event when determining that the moving object is positioned in the following region, and which generates a following-motion-suspension event when determining that the moving object is not positioned in the following region. The path-forming section may form a following path for the robot to follow the moving object at a position designated by the designated-position data included in the motion command when the moving-object-arrival event is generated.

(19) In the robot controller according to the present invention, the event-detecting section may determine at given intervals whether or not the moving object is positioned in the following region.

(20) In the robot controller according to the present invention, the following region may be defined by two first lines parallel to the movement direction of the moving object and two second lines perpendicular to the first lines, on a carrying surface of the conveyor.

(21) In the robot controller according to the present invention, the path-forming section may form the following path for the robot to follow the moving object by adding an additional path in the movement direction of the moving object to a direct path of a tool of the robot in a direction toward a starting position, where the moving object is positioned at the start of the following motion, wherein the additional path is obtained by transforming change of the position of the moving object in the conveyor coordinate system to that in the robot coordinate system and further to that in a robot joint-angle coordinate system, and the direct path is obtained by transforming positions of the tool of the robot and the moving object at the start of the following motion, respectively set in the robot coordinate system and the conveyor coordinate system, to those in the robot joint-angle coordinate system.

(22) In the robot controller according to the present invention, the user-program-executing section may start performing a process in response to the following-motion-suspension event when the event-detecting section generates the following-motion-suspension event.

(23) In the robot controller according to the present invention, the process in response to the following-motion-suspension event may be a process to suspend the formation of the additional path.

(24) In the robot controller according to the present invention, the path-forming section may suspend the formation of the additional path and form the following path consisting of the direct path in a direction toward a position designated by the designated position data, when the user-program-executing section determines that the designated-position data included in the motion command are set in the robot coordinate system.

(25) In the robot controller according to the present invention, one conveyor coordinate system may be provided for each of a plurality of the conveyors.

(26) In the robot controller according to the present invention, the conveyor coordinate system and the following region may be provided for each of a plurality of the robots.

(27) In the robot controller according to the present invention, the conveyor may comprise a straight conveyor.

(28) In the robot controller according to the present invention, the conveyor may comprise either an arc-shaped conveyor or a turntable, and the coordinate system of the conveyor may comprise an x-coordinate represented by a rotation angle, a z-coordinate represented by an axis of the rotation of the conveyor, and a y-coordinate represented by a distance from the axis of the rotation.

With the arrangement described in the above (1) and (15), by updating the current position of the moving object in the conveyor coordinate system, the computation for the update becomes simple compared with the case of the update in the robot coordinate system. When describing a predetermined motion to the moving object, a simple and intuitive designation of the position is possible by using the conveyor coordinate system as a reference, and program description becomes easy.

With the arrangement described in the above (2) and (16), since the x-axis of the conveyor coordinate system is disposed in the direction of the movement of the moving object, only the x-coordinate value of the position of the moving object varies. Therefore, only the x-coordinate value must be updated for the update of the current position of the moving object, whereby the amount of computation can be reduced compared with the case of the update in the robot coordinate system.

With the arrangement described in the above (3) and (17), the following motion of the robot can be started only by a motion command including designated-position data of the conveyor coordinate system, without a following-motion-start command. Therefore, program description by the user without considering the movement of the conveyor is made possible.

With the arrangement described in the above (4), (5), (6), (18), (19), and (20), a following region is set in the conveyor coordinate system, and it is determined, on the basis of the following-region and the current position of the moving object, whether or not the moving object is positioned in the following region. When it is determined that the moving object is positioned in the following region, a moving-object-arrival event is generated, and when the moving-object-arrival event is generated, a process for the robot to follow the moving object at a position designated by the designated-position data included in the motion command. Therefore, it is not necessary to describe a process loop in a user program while monitoring the position of the moving object, whereby the program can be readable and the process speed can be increased.

With the arrangement described in the above (7) and (21), the additional path in the movement direction of the moving object is formed on the basis of the change of the current position of the moving object and, whereby the following path can be formed such that the variations in the speed of the conveyor are compensated for.

With the arrangement described in the above (8) and (22), when it is determined that the moving object is not positioned in the following region, a following-motion-suspension event is generated and a process corresponding to the following-motion-suspension event starts. Therefore, an operation program for avoiding a risk of an error being produced in that, for example, the robot keeps the following motion beyond its operational range. That is, the user must only described a motion for avoiding the above risk as a process corresponding to the following-motion-suspension event.

With the arrangement described in the above (9) and (23), when the following-motion-suspension event is generated, the formation of the additional path is suspended. Therefore, a risk in that the robot continues the following motion beyond the following region can be automatically and reliably avoided.

With the arrangement described in the above (10) and (24), in execution of a motion command including designated-position data set in the robot coordinate system, the formation of the additional path is suspended and the direct path toward the designated position is formed. Therefore, when the targeted position (designated position) is disposed outside the conveyor, the formation of the additional path can be automatically suspended and the robot can be automatically moved to the designated position, by the user describing the designated position data in the robot coordinate system, whereby the user can create a program without considering the current state of the robot or the movement of the conveyor.

With the arrangement described in the above (11) and (25), when a plurality of the conveyors are used, a conveyor coordinate system is provided for each of the plurality of conveyors, whereby a program for conveying the moving object from one of the conveyors to another conveyor can be easily created by describing a motion command including designated-position data set in the corresponding coordinate system.

With the arrangement described in the above (12) and (26), a plurality of the robots can be used for one conveyor by providing the conveyor coordinate system and the following region for each robot.

With the arrangement described in the above (13), (14), (27), and (28), the advantages described above can be offered by using either a straight conveyor, an arc-shaped conveyor, or a turntable as the conveyor.

BRIEF DESCRIPTION OF THE DRAWINGS

FIG. 9 is a graph showing the relationship of position in the first embodiment according to the present invention;

FIG. 20 is a description of a known user program, in which "workpos.x" represents the x-coordinate of the current position of a work, "workpos.y" represents the y-coordinate of the current position of the work, a following operation is performed in a region (100, 300)–(200, 400), "TRACK ON/OFF" represents a command to/not to follow the conveyor, and "HANDLING" represents a function which returns whether or not handling is completed, and returns "1" when completed.

DESCRIPTION OF THE PREFERRED EMBODIMENTS

First Embodiment

Figure 1:
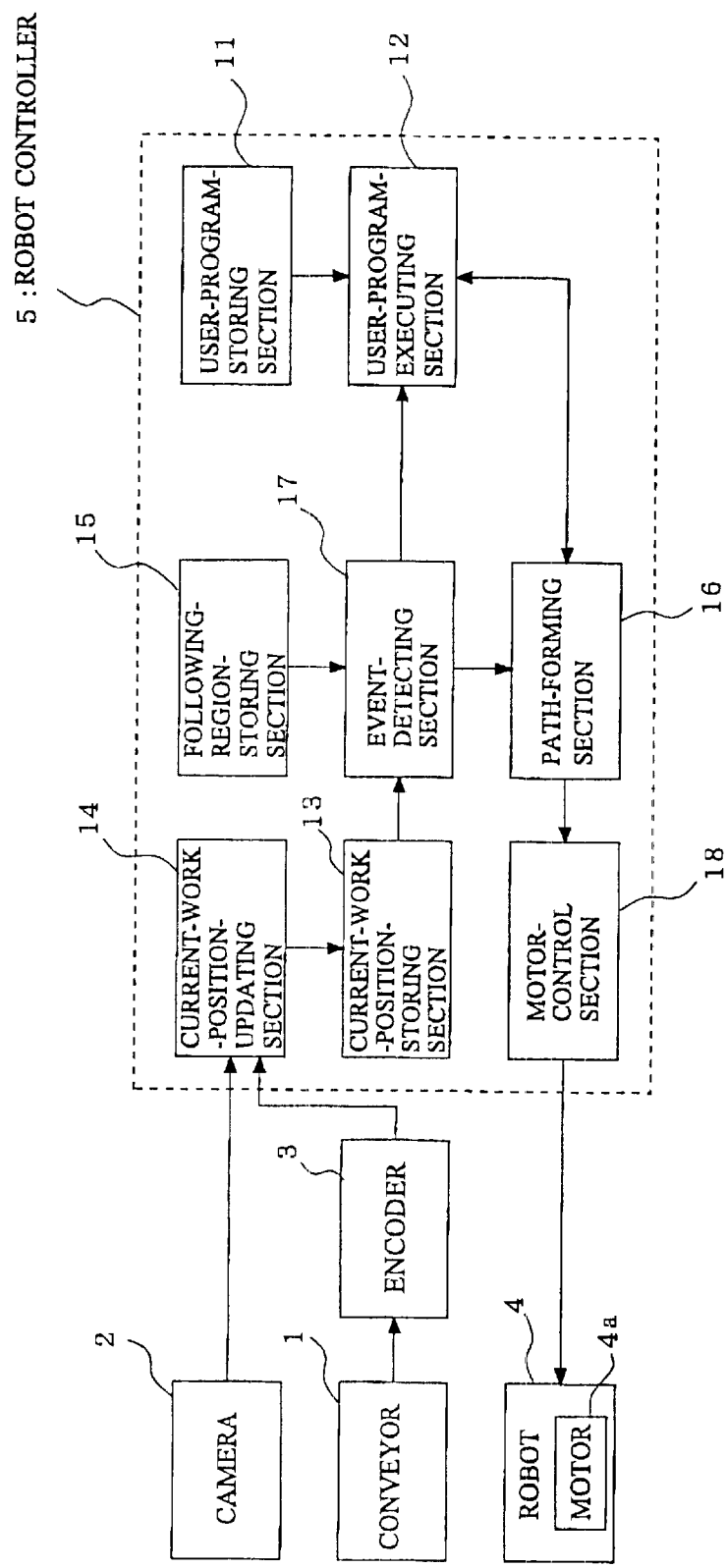
FIG. 1 is a functional block diagram of a handling system using a robot controller according to a first embodiment of the present invention.
Figure 2:
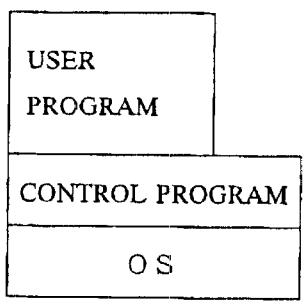
FIG. 2 is an illustration showing the configuration of software according to the first embodiment of the present invention.
Figure 3:
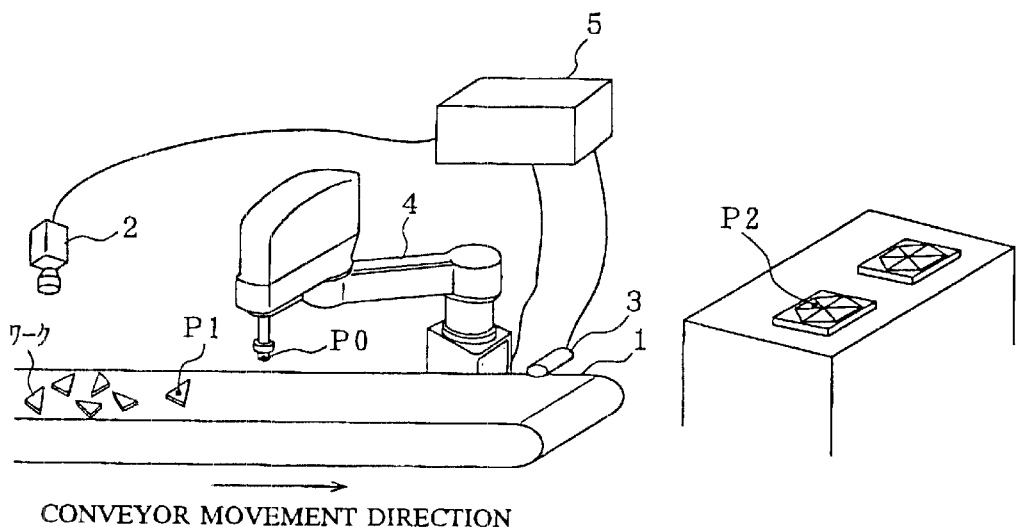
FIG. 3 is an illustration of an outline of the system according to the first embodiment of the present invention.

FIG. 1 is a functional block diagram of a handling system using a robot controller according to a first embodiment of the present invention. FIG. 2 is an illustration showing the configuration of software according to the first embodiment of the present invention. FIG. 3 is an illustration of an outline of the handling system according to the first embodiment of the present invention.

FIGS. 1 and 3 show a conveyor 1 which is a conveying device, a camera 2 for detecting a work conveyed on the conveyor 1, an encoder 3 which is mounted to the conveyor 1 and which determines the amount of movement of the conveyor 1, and a robot 4. The conveyor 1, the camera 2, the encoder 3, and the robot 4 are connected to a robot controller 5, thereby forming a handling system.

The robot controller 5 includes a user-program-storing section 11 for storing a user program, a user-program-executing section 12 for executing the user program stored in the user-program-storing section 11, a current-work-position-storing section 13 for storing the current position of a work which has been recognized by the camera 2, a current-work-position-updating section 14 for updating the current position of the work stored in the current-work-position-storing section 13 in accordance with the amount of movement of the conveyor 1, a following-region-storing section 15 in which a following region is set, and a path-forming section 16 which forms a path of an operational point (a tool of the robot) by setting an angle for each joint, converts the formed path into a motor-command value (pulses), and outputs the value to a motor-controlling section 18 which is described below. The robot controller 5 also includes an event-detecting section 17 which detects an event of the work with respect to the following region, and the motor-controlling section 18 for controlling a motor 4a of each joint in response to the motor command values from the path-forming section 16. The path-forming section 16 and the event-detecting section 17 are each activated every given sampling time by external hardware such as a timer and an operating system (OS) which is described below.

In FIG. 2, software of the robot controller 5 is formed with a user program, an operating system (OS) having an event function, a multi-tasking ability, and the like, for controlling the robot controller 5 and a control program for detect positions of the robot 4 and the conveyor 1.

The conveyor coordinate system (the coordinate system of the conveyor device) which is used in the robot controller 5 is described below.

Figure 4:
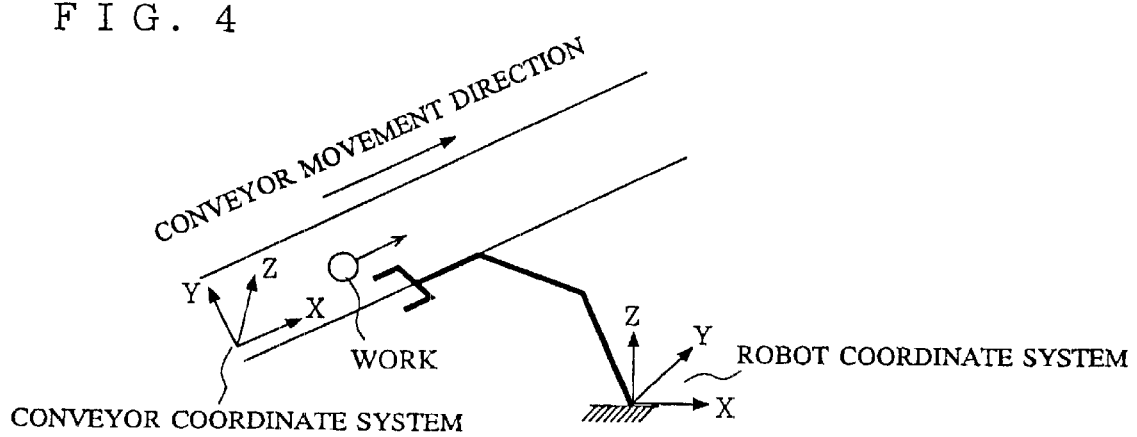
FIG. 4 is an illustration showing a conveyor coordinate system.

FIG. 4 is an illustration showing the conveyor coordinate system.

The conveyor coordinate system is defined by the x-axis parallel to the motion of the work, the y-axis forming a work plane (carrying surface of the conveyor 1) together with the x-axis, the y-axis being perpendicular to the x-axis in a straight conveyor, and the z-axis perpendicular to the x-axis and the y-axis. The conveyor coordinate system is uniquely transformable to the robot coordinate system. The origin of the conveyor coordinate system may be the position of the work at a certain time, or may be set at a given position. The robot coordinate system is a rectangular coordinate system whose origin is disposed at the installation base of the robot 4.

The position in the conveyor coordinate system and the position in the robot coordinate system are described in the user program as follows.

The data of the position in the robot coordinate system: $P_R = x,y,z,u,v,w$

The data of the position in the conveyor coordinate system: $P_c = xc,yc,zc,uc,vc,wc/CNV$ The symbols x, y, and z represent components of a position along the x, y, and z-axes, respectively, in the robot coordinate system, and the symbols xc, yc, and zc represent components of the position along the x, y, and z-axes, respectively, in the conveyor coordinate system. The symbols u, v, and w indicate the orientation at the position in the robot coordinate system, and the symbols uc, vc, and wc represent the orientation at the position in the conveyor coordinate system. The symbol "/CNV" which is attached at the end of the series of coordinate values indicates that they are conveyor coordinates.

The conveyor coordinate system is uniquely transformable to the robot coordinate system, as described above. The transformations from one to the other are expressed as below, in which T represents a transformation matrix.

$(x,y,z,u,v,w,1) = T \cdot (xc,yc,zc,uc,vc,wc,1)$
$(xc,yc,zc,uc,vc,wc,1) = T^{-} \cdot (x,y,z,u,v,w,1)$ By using such a conveyor coordinate system, only the x-coordinate of the position of the work varies according to the movement of the conveyor. By computing the current position of the work by using the conveyor coordinate system, the computation of the y-coordinate and the z-coordinate can be omitted, whereby a large number of the works moving on the conveyor can be processed without imposing a large burden on the robot controller 5.

Figure 5:
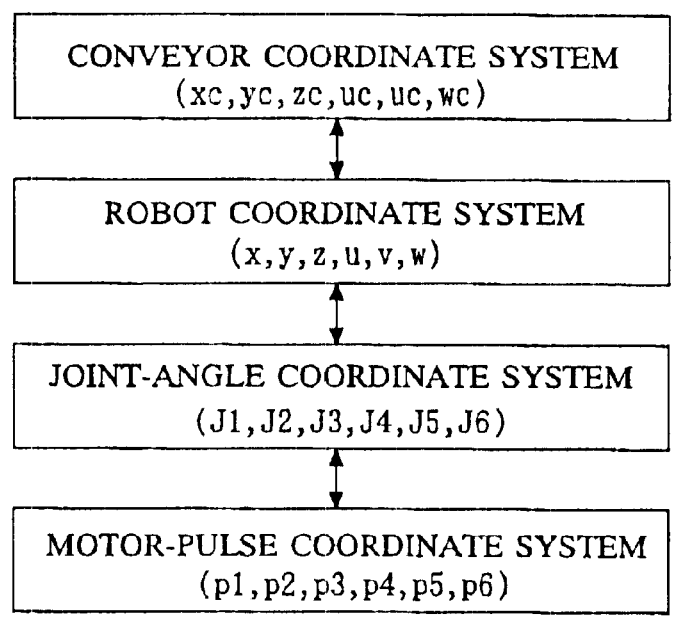
FIG. 5 is an illustration showing a hierarchical structure of coordinate systems.

FIG. 5 is an illustration showing a hierarchical structure of coordinate systems.

The robot coordinate system, a joint-angle coordinate system, and a motor-pulse coordinate system are known coordinate systems. The conveyor coordinate system newly introduced according to the present invention and the known coordinate systems form the hierarchical structure shown in FIG. 5. These coordinate systems are transformable to each other. A command value for the robot 4 inputted into any coordinate system is transformed into the other coordinate systems, one after another, which are positioned in the subsequent hierarchies, and is finally transformed into pulses based on the motor-pulse coordinate system to be outputted to a motor-controlling section 18.

Examples of the statement describing a motion command GO in the individual coordinate systems are shown below.

The user describes the motion command by using the data of position $P_C$ in the conveyor coordinate system when the target position of the tool of the robot is a position on the conveyor 1, for example, when a moving work is targeted. The user describes the motion command by using the data of position $P_R$ in the robot coordinate system when the target position of the tool of the robot is a position outside the conveyor 1, for example, when a work on a table disposed at the side of the robot 4 is targeted.

Command in the conveyor coordinate system: GO xc,yc,zc,uc,vc,wc/CNV

Command in the robot coordinate system: GO x,y,z,u,v,w

Command in the joint-angle coordinate system: GO JA(J1,J2,J3,J4,J5,J6)

Command in the motor-pulse coordinate system: GO PULSE(p1,p2,p3,p4,p5,p6)

The above J1 to J6 in the joint-angle coordinate system each represent a joint angle, and p1 to p6 in the motor-pulse coordinate system each represent the number of pulses, which are designated for each joint of the robot. In the conveyor coordinate system, the designation may be made by describing "GO workpos" by using a variable "workpos" which indicates the current position of the work, for example, on the conveyor 1, instead of designating by using the data of position $P_c$.

By referring to FIG. 1, the camera 2 observes the work on the conveyor 1. The current-work-position-updating section 14 obtains the position of the work in the conveyor coordinate system from the image captured by the camera and stores the data of the position in the current-work-position-storing section 13. This process is referred to as "work registration". On the other hand, the encoder 3 outputs conveyor pulses. The current-work-position-updating section 14 computes the amount of movement of the work on the conveyor 1 in accordance with the conveyor pulses and sequentially updates the data of the position stored in the current-work-position-storing section 13 The amount of movement of the work can be determined by obtaining the difference between the number of conveyor pulses accumulated until image-capturing and the number of conveyor pulses accumulated until the moment of computation, and obtaining the product of the difference by the amount of movement per conveyor pulse in the conveyor coordinate system which is set in advance. The current-work-position-updating section 14 obtains the current position of the work in the conveyor coordinate system by adding the amount of movement of the work thus computed to the coordinate value computed when image-capturing, and updates the data stored in the current-work-position-storing section 13. Since the y-coordinate and the z-coordinate do not vary, the current-work-position-updating section 14 computes only the x-coordinate, omitting the computation of the y-coordinate and the z-coordinate.

Figure 6:
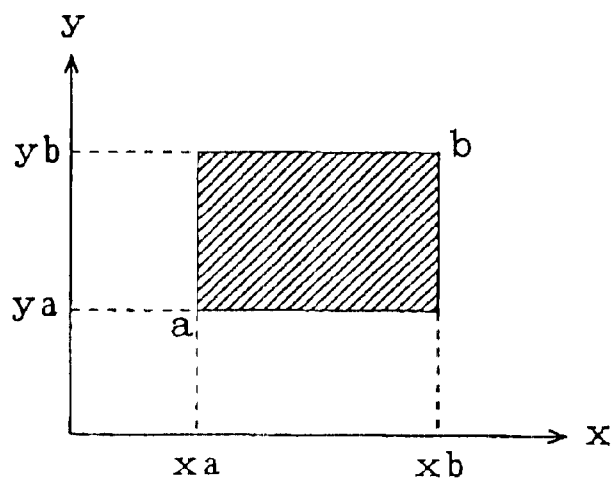
FIG. 6 is an illustration of a following region.

FIG. 6 is an illustration of the following region which is stored in the following-region-storing section 15. The coordinate system shown in FIG. 6 is the conveyor coordinate system (the z-axis is not shown).

The following region is a region in which the robot 4 performs a following operation, and is set by the user by inputting coordinate values (following-region coordinates) in the conveyor coordinate system, considering the operational range of the robot 4. That is, when designating the hatched region in FIG. 6, following-region coordinates (xa, ya, 0) and (xb, yb, 0) of two points a and b, respectively, are stored in the following-region-storing section 15 as following-region-setting values.

Figure 7:
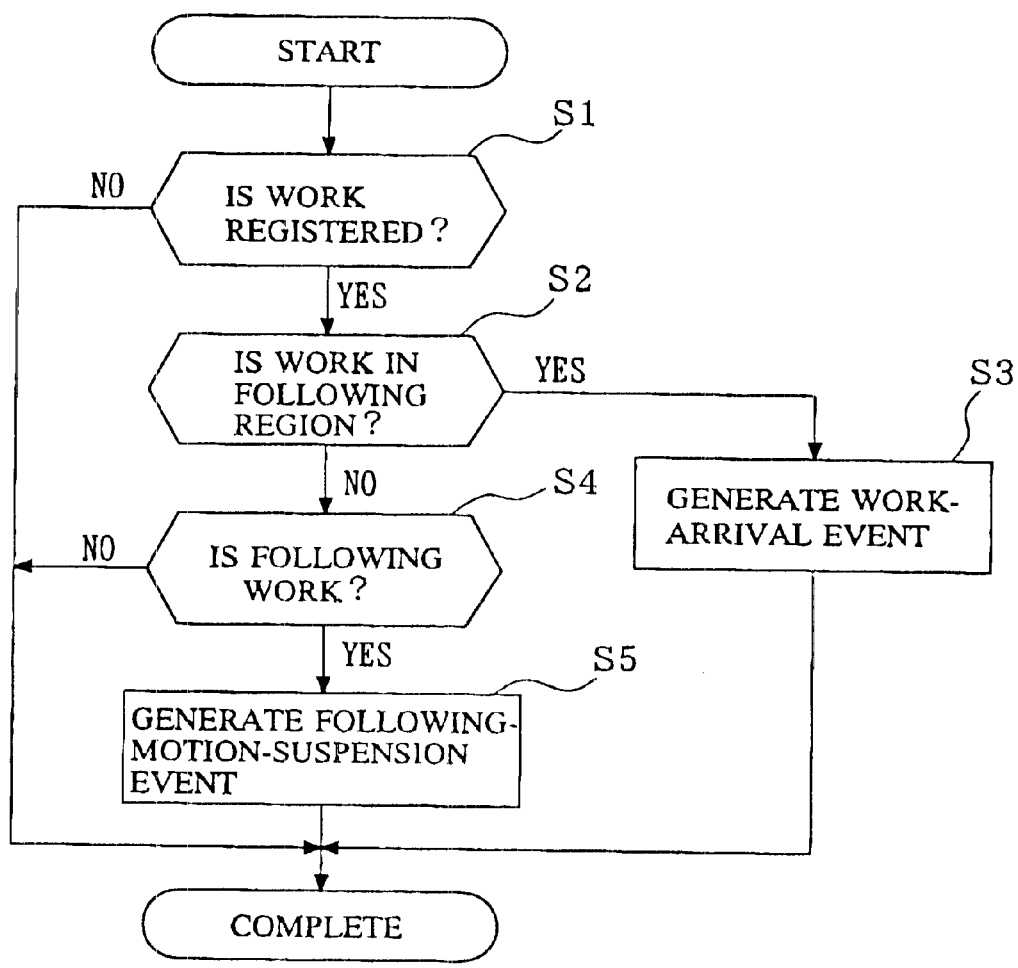
FIG. 7 is a flowchart of the operation of an event detecting section shown in FIG. 1, which is performed at given sampling intervals.

FIG. 7 is a flowchart of the operation of the event-detecting section 17 shown in FIG. 1.

The event-detecting section 17, when called at the given intervals, refers to the current-work-position-storing section 13 and checks whether or not the work is registered (step S1). If the work is registered, the event-detecting section 17 checks whether or not the work is positioned in the following region based on the current work position and the following-region-setting values stored in the following-region-storing section 15 (step S2). If the work is positioned in the following region, the event-detecting section 17 generates a work-arrival event (step S3), and if the work is not positioned in the following region and the robot 4 is following the work (step S4), the event-detecting section 17 generates a following-motion-suspension event (step S5) and completes the process.

Figure 8:
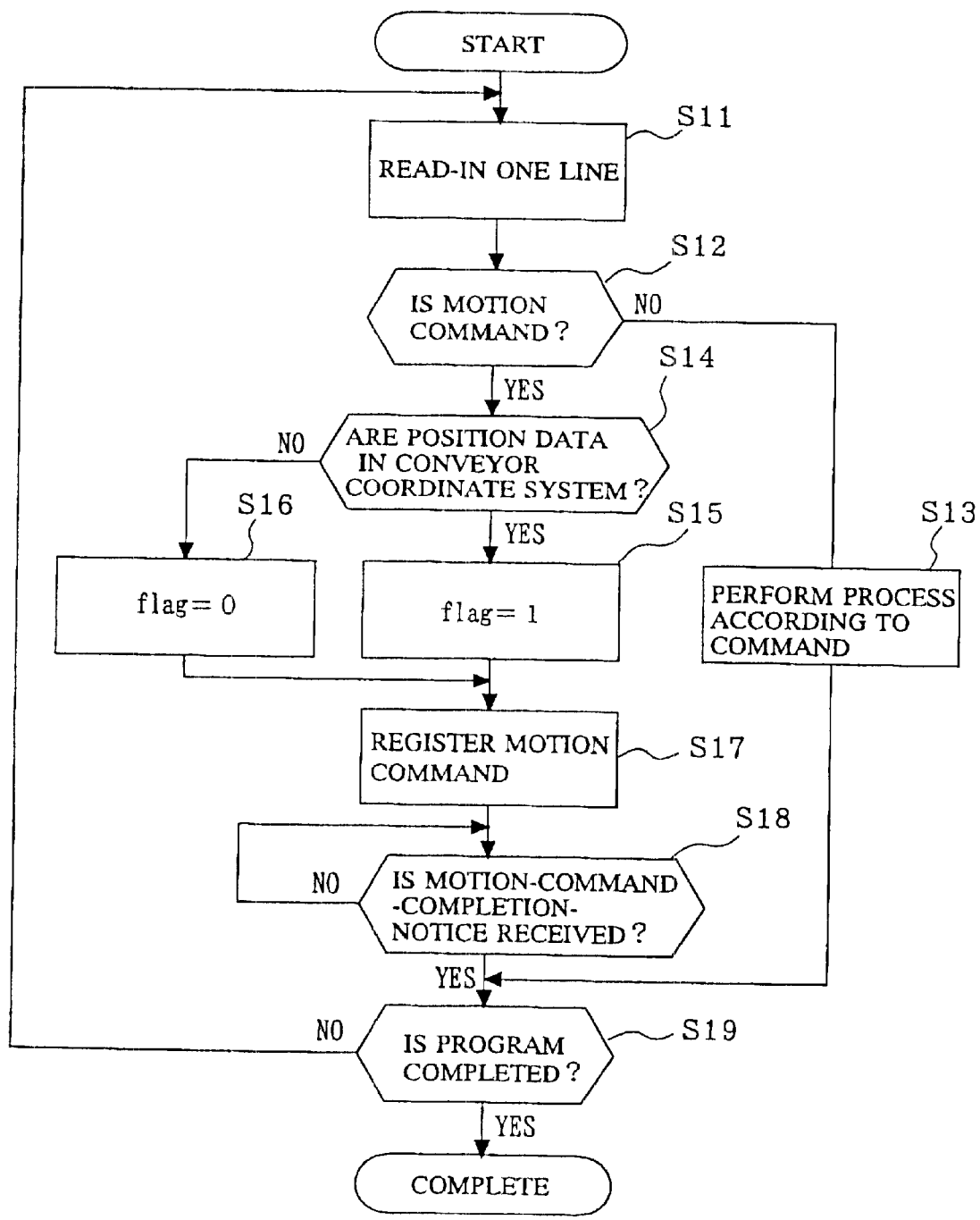
FIG. 8 is a flowchart of the operation of a user-program-executing section shown in FIG. 1.

FIG. 8 is a flowchart of the operation of the user-program-executing section 12 shown in FIG. 1.

The user-program-executing section 12 reads in one line of the statement described in the user program (step S11), and determines whether or not the command of the read-in statement is a motion command (step S12). If it is determined that the command is not a motion command, the user-program-executing section 12 performs a process in response to the command (step S13). If it is determined that the command is a motion command, the user-program-executing section 12 checks whether the data of the position designated by the motion command is for the conveyor coordinate system or the robot coordinate system (step S14). If they are for the conveyor coordinate system, the user-program-executing section 12 sets a flag to flag 1 (step S15), and if they are for the robot coordinate system, the user-program-executing section 12 sets the flag to flag 0 (step S16). Then, the motion command is registered (step S17). The registration of the motion command is performed such that necessary data for forming a path in the path-forming section 16 are computed and the computed data are registered in the path-forming section 16, which is described below in detail.

The user-program-executing section 12, after registering the motion command, moves into a waiting mode for awaiting a motion-command-completion notice from the path-forming section 16 (step S18). That is, the user-program-executing section 12 waits until the tool of the robot 4 reaches a position designated by the motion command. When the reach of the tool is noticed by the motion-command-completion notice from the path-forming section 16, the user-program-executing section 12 determines whether or not the process performed is for the last command(step S19). If it is determined that the motion command is not the last one, the process goes back to step S11 and is repeated until the program is completed.

The registration process of the motion command is described below.

The process is performed such that a joint-angle-change $\Delta J$ which is necessary for moving the tool of the robot 4 from the current position to a position designated by the motion command (that is, the position of the work before starting a following motion) and a time T which is necessary for moving the tool of the robot 4 from the current position to the designated position are computed, and the result is registered in the path-forming section 16.

The joint-angle-change $\Delta J$ is obtainable from the difference between the current joint angle of the robot 4 and a joint angle of the robot 4 with the tool positioned at the designated position. FIG. 9 is a graph showing the relationship between the position of the work and the joint angle of the robot 4, in which the current position of the robot 4 is represented by P0 and the designated position on the conveyor 1 is represented by P1 (the current position P0 is in the robot coordinate system and the designated position P1 is in the conveyor coordinate system). The joint-angle-change $\Delta J$ is obtained from the following expression by using joint-angle coordinates J1 obtained from the current position P1 of the work transformed to the robot coordinate system and then to the joint-angle coordinate system, and joint-angle coordinates J0 obtained from the current position P0 of the robot 4 transformed to the joint-angle coordinate system.

$$\Delta J = J1 - J0$$

The time T is computed by using a computing method set in advance in consideration of the restrictions on a motor of each joint and the like. The joint-angle-change $\Delta J$ and the time T thus computed are registered as a motion command in the path-forming section 16.

Figure 10:
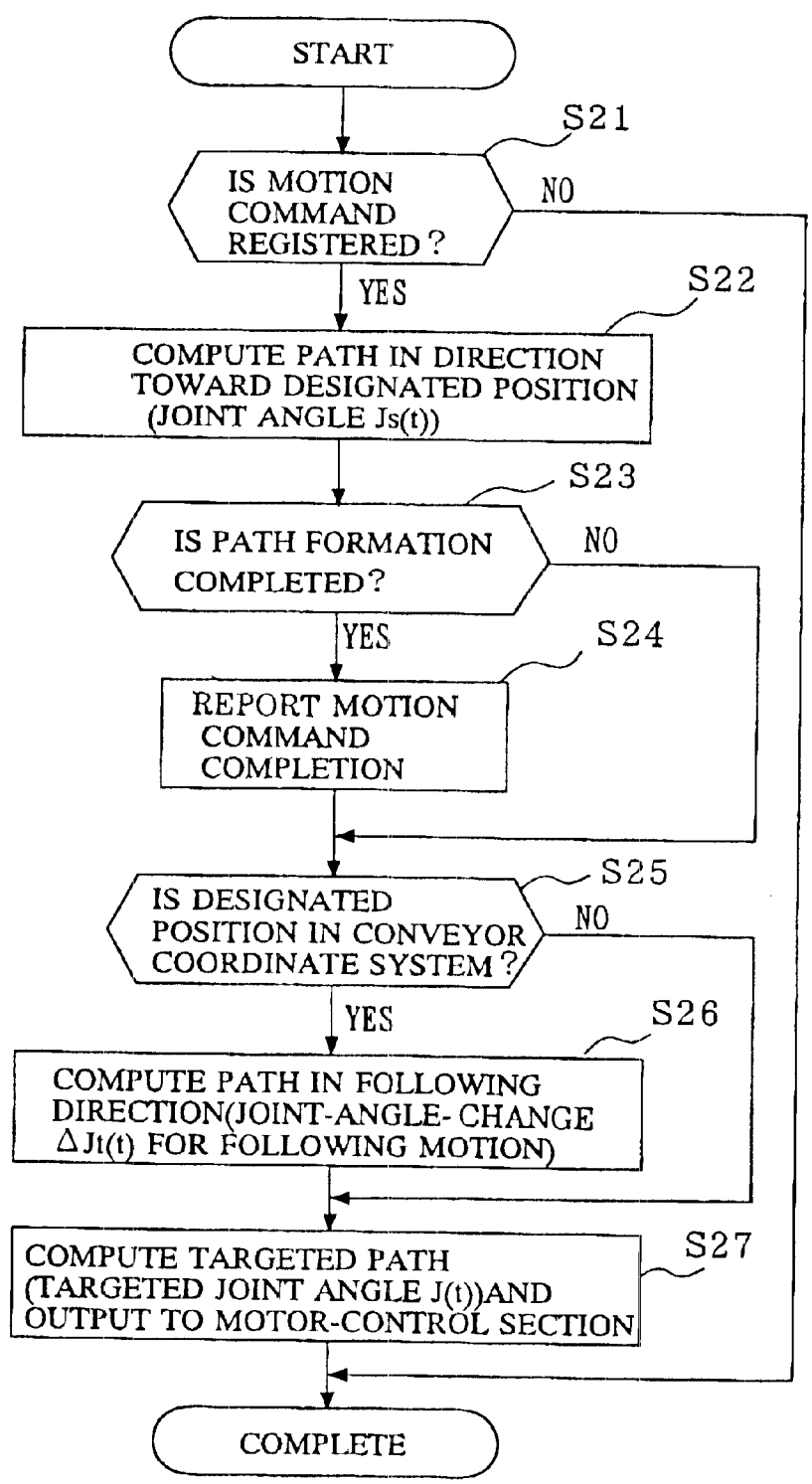
FIG. 10 is a flowchart of the operation of a path-forming section shown in FIG. 1.

FIG. 10 is a flowchart of the operation of the path-forming section 16 shown in FIG. 1.

The path-forming section 16, when called at given sampling intervals, checks whether or not the motion command is registered (step S21). If the motion command is registered, that is, the motion of the robot 4 is instructed, the path-forming section 16 forms a following path along which the motion is performed. In order to form the following path, firstly, a direct joint angle $J_s(t)$ is computed (step S22), which represents a direct path in a direction to move the tool of the robot 4 from a current position to a designated position included in the motion command (in a direction toward the position of the work at the time when the robot 4 starts the following motion). The joint angle $J_s(t)$ is obtained by the following expression using the joint-angle-change $\Delta J$ and the time T.

$$J_s(t) = J_0 + \Delta J \cdot (t-t_0)/T \quad (t_0 \leq t \leq t_0+T)$$

In the above expression, $J_0$ denotes a joint angle of the robot 4 at the current position P0, and $t_0$ denotes the time when the following motion starts.

Then, it is determined whether or not path forming is completed based on a current time t (step S23). If the current time t is less than $t_0+T$, it is determined that the path forming is not completed and it is checked according to the flag whether the designated position is given by the conveyor coordinates or the robot coordinates (step S25). If flag 1 is recognized, it is determined that the designated position is given by the conveyor coordinates, and an additional joint-angle-change $\Delta J_f(t)$ for an additional path in the moving direction of the work, that is, for an additional following motion in consideration of the movement of the conveyor 1 is computed (step S26).

The computation of the additional joint-angle-change $\Delta J_f(t)$ for the additional following motion is described with reference to FIG. 9.

In FIG. 9, the position of the work at the time t indicated by the conveyor coordinates is represented by $P_t(t)$, and the change of $P_t(t)$ is detected by the encoder 3. If $P_t(t)$ is checked, for example at predetermined intervals, change $\Delta P_t(t)$ during an interval may be obtained. The joint-angle-change $\Delta J_f(t)$ for the additional following motion corresponds to the change $\Delta P_t(t)$ of $P_t(t)$ and is computed by the following expression based on joint angles $J_t(t)$ which are obtained by transforming the positions $P_t(t)$, in the conveyor coordinate system to that in the joint angle coordinate system, via that in the robot coordinate system.

$$\Delta J_f(t) = J_t(t) - J1$$

The additional joint-angle-change $\Delta J_f(t)$ shows the movement of the work in the joint-angle coordinate system, and is used in forming the following path in the following direction of the robot 4, so that the following path is formed in consideration of the amount of movement (the speed) of the conveyor 1.

The path-forming section 16 computes a targeted joint angle $J(t)$ for a following path as a target, by adding the direct joint angle $J_s(t)$ in a direction toward the designated position and the additional joint-angle-change $\Delta J_f(t)$ in the moving direction of the work, for each joint (step S27). The targeted joint angle $J(t)$ is obtained by the following expression.

$$J(t) = J_s(t) + \Delta J_f(t)$$

The path-forming section 16 transfers the targeted joint angle $J(t)$ to the motor-pulse coordinates and outputs the same to the motor-controlling section 18 (step S27). If it is determined in step S25 that the designated position is given in the robot coordinate system, the process proceeds to step S27 by skipping step S26. By omitting the computation of the additional joint-angle-change $\Delta J_f(t)$, no additional path is formed and only a direct path toward the designated position is formed. The path-forming section 16 sequentially forms following paths according to the coordinate system in which the designated position included in the command is indicated, and transforms targeted joint angles of the following paths to the motor-pulse coordinates and outputs the same at a given sampling frequency.

If the time $t_0+T$ has passed and handling of the work has been completed, it is determined that path formation has been completed in step S23, so as to give a notice of the completion of the motion command to the user-program-executing section 12 (step S24). Even when the time $t_0+T$ has passed, the additional joint-angle-change (the additional path) $\Delta J_f(t)$ is continuously formed to keep the robot 4 performing the following motion unless suspension of the following motion is instructed. If the work goes out of the following region and the robot 4 continues the following motions the event-detecting section 17 generates a following-motion-suspension event. Therefore, by making a program designed to suspend following motion according to the following-motion-suspension event, formation of the additional path is suspended to avoid such an error that a following motion is performed outside the following region.

With this arrangement, if the user intends to make the tool of the robot 4 follow the work on the conveyor 1, the user can make the robot 4 automatically start the following motion in consideration of an additional movement of the work on the conveyor, by indicating the position of the work in the conveyor coordinate system (for example, indicating it with the variable workpos which indicates the current position of the work). Further, if the user intends to array the works onto a table disposed at the side of the robot 4 after handling the works on the conveyor 1, the user can automatically suspend the formation of the additional path and move the tool of the robot 4 to a targeted position on the table by indicating the targeted position in the robot coordinate system. Therefore, the user can design a program as easily as a program for processing stationary works without considering the movement of the conveyor 1.

Figure 11:
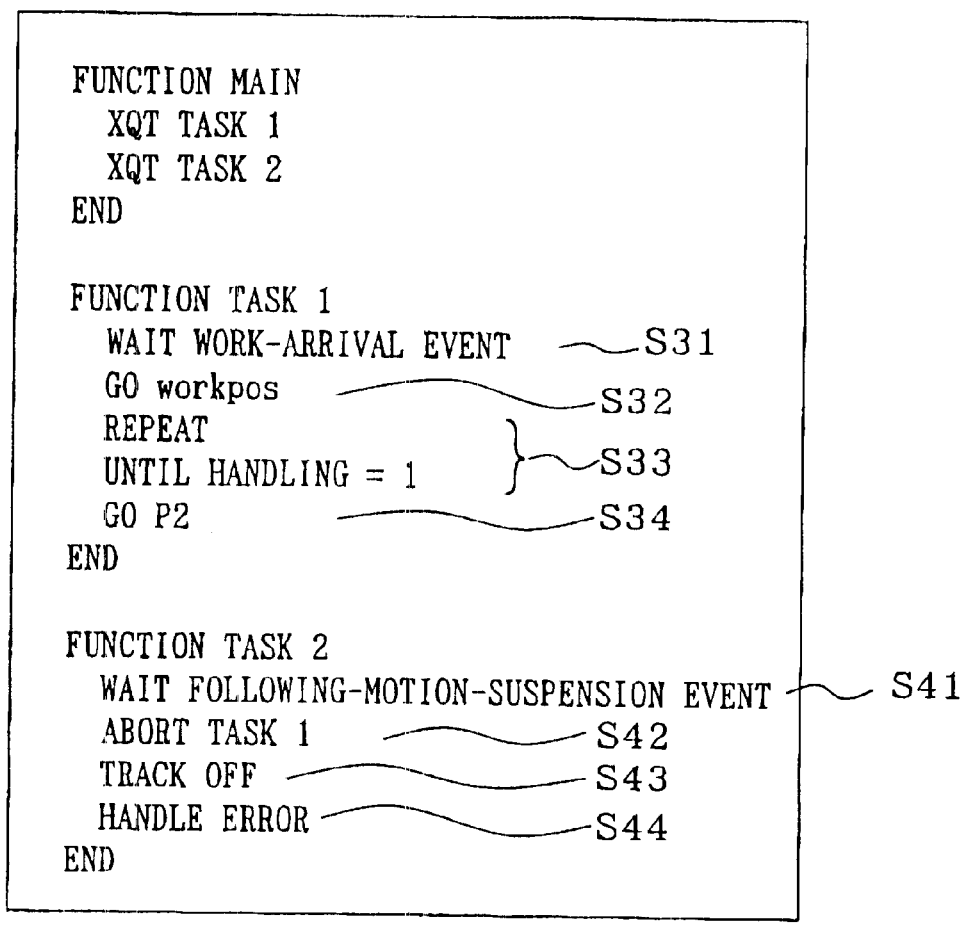
FIG. 11 is a description of a user program according to the first embodiment of the present invention, in which "XQT task 1" or "XQT task 2" indicates a command to activate a program assigned with a task name of "task 1" or "task 2", respectively, and "ABORT task 1" indicates a command to complete the program assigned with the task name of "task 1"
Figure 12A:
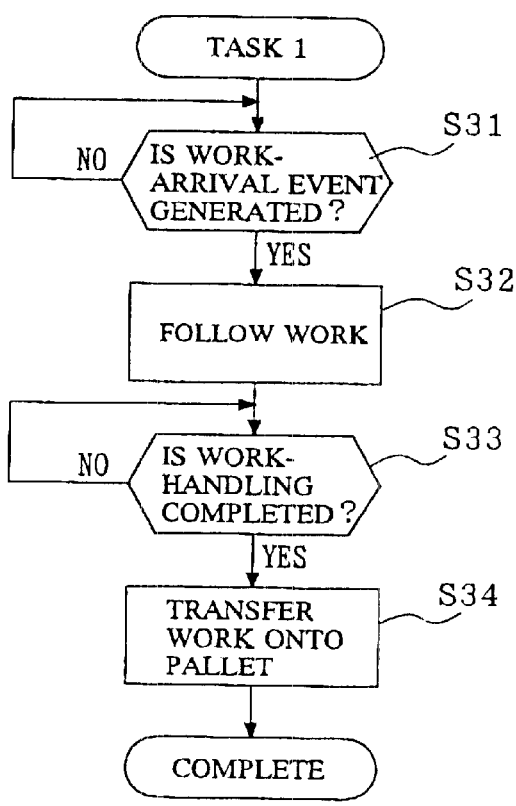
FIGS. 12A and 12B are flowcharts for processing task 1 and task 2, respectively, shown in FIG. 11.
Figure 12B:
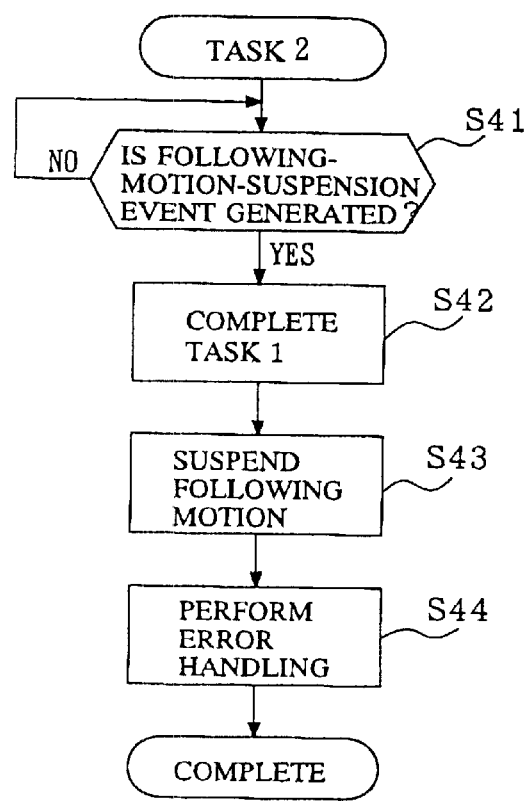

FIG. 11 is an example of a user program according to the first embodiment of the present invention. FIGS. 12A and 12B are flowcharts for processing task 1 and task 2 shown in FIG. 11, respectively. Corresponding process steps in FIGS. 11, 12A, and 12B are referred to by using the same reference numerals.

In a main task (FUNCTION MAIN) of this program, task 1 and task 2 are activated in the first line and the second line, respectively, by a command (XQT) which instructs the execution of other functions. In task 1, the arrival of the work is awaited (step S31). If a work-arrival event is generated by the event-detecting section 17 and the arrival of the work is recognized, the robot 4 is driven to follow the work (step S32). When handling is completed (step S33), the tool of the robot 4 is moved to a position P2 (a position in the robot coordinate system) (step S34). In task 2, a following-motion-suspension event is awaited in the first line (step S41). If the following-motion-suspension event is generated by the event-detecting section 17, that is, if the work goes out of the following region, task 1 is suspended in the second line of task 2 (step S42), the following motion is suspended in the third line (step S43), and error handling is performed in the fourth line (step S44).

An operation according to the first embodiment is described below, in which the user program shown in FIG. 11 is executed such that the robot 4 starts from the current position P0 (see FIG. 3) to follow the work flowing on the conveyor 1 (P1 is a position of the work at the time of issuance of an operation command (see FIG. 3)) to handle the work, and places the work on a pallet arranged on a table disposed at the side of the robot 4 at the position P2 (see FIG. 3).

The user stores the following region in the following-region-storing section 15 in advance, then executes a program to recognize the work by using the camera 2, whereby the camera 2 starts imaging. The position of the work is obtained from the captured image, stored in the current-work-position-storing section 13, and sequentially updated by the current-work-position-updating section 14. In the updating operation, the position in the conveyor coordinate system is computed. The amount of the computation is significantly reduced compared with a known method. The event-detecting section 17 checks, at given sampling intervals, the current position of the work and the set value of the following region stored in the following-region-storing section 15, and generates work-arrival events repeatedly since the work arrives at the following region and until the work leaves the following region. When the work leaves the following region, the event-detecting section 17 generates a following-motion-suspension event.

The above processes start by executing a program concerning the recognition of the work even before the operational program of the robot 4 is activated by the user. The processes are performed at the side of the robot controller 5 independently of the operation of the robot 4.

When the user executes, for example, the user program (robot-operating program) shown in FIG. 11, the user-program-executing section 12 activates task 1 and task 2. In task 1, the arrival of the work is awaited in the first line, and the user-program-executing section 12 executes the subsequent command when the event-detecting section 17 generates a work-arrival event. The command in the second line is a motion command including position data which are the variable "workpos" designating the current position of the work on the conveyor 1. Therefore, the user-program-executing section 12 sets the flag to flag 1, computes the joint-angle-change $\Delta J$ and the time T, and registers the motion command in the path-forming section 16. Then, the process moves into a waiting mode for a notice of the completion of the motion command from the path-forming section 16.

The path-forming section 16 forms a following path according to the registered motion command. Since this command includes position data in the conveyor coordinate system, the direct joint angle $J_s(t)$ and the additional joint-angle-change $\Delta J_t(t)$ are computed, a following path is formed by adding the direct joint angle $J_s(t)$ and the additional joint-angle-change $\Delta J_t(t)$, and the joint angle $J(t)$ for the following path is transformed to the motor-pulse coordinates and outputted. The motor-controlling section 18 controls the joints of the robot 4 in accordance with the pulsed signal outputted from the path-forming section 16. The path-forming section 16 repeatedly forms the path every given sampling time, and issues a notice of the completion of the motion command to the user-program-executing section 12 when handling is completed.

When the user-program-executing section 12 receives the notice of the completion of the motion command from the path-forming section 16, the user-program-executing section 12 executes the subsequent command. In another motion command in the third line, the position P2 is designated in the robot coordinate system. Therefore, the user-program-executing section 12 sets the flag to flag 0, computes the joint-angle-change $\Delta J$ and the time T, and registers the motion command. The path-forming section 16 computes the direct joint angle $J_s(t)$ in accordance with the registered motion command. Omitting the computation of the additional joint-angle-change, the direct joint angle $J_s(t)$ is considered as the targeted joint angle $J(t)$ which is transformed to the motor-pulse coordinates and outputted. Thereby, the robot 4 suspends the following motion, which the robot 4 has been performing after handling the work, and moves to the position P2.

In task 2, a following-motion-suspension event is awaited in the first line. When the event-detecting section 17 generates the following-motion-suspension event, task 1 is suspended in the second line, and the following motion is suspended in the third line.

According to the first embodiment described above, the amount of computation concerning the current position of the work is reduced by applying the conveyor coordinate system, whereby the load on the robot controller 5 can be reduced.

The additional path is automatically formed only by executing motion command including position data in the conveyor coordinate system (for example, the data of the position having variables indicating the data of the position in the conveyor coordinate system or the coordinate system qualification "/CNV" attached). On the contrary, when the motion command including position data in the robot coordinate system is executed, the formation of the additional path is automatically suspended. Therefore, the user can design programs as easily as a program for processing a stationary work without considering the movement of the conveyor 1.

Since a following region is set in the conveyor coordinate system, and the arrival and deviation of the work in and from the following region are detected and are generated as events in the robot controller 5 (by the event-detecting section 17), the load on the robot controller 5 can be reduced compared with a known method in which the detection is performed by a user program, whereby the processing speed can be prevented from decreasing and the performance is improved. It is not necessary for the user to describe a process loop in the user program, and only a command to wait for an event generated by the event-detecting section 17 is described, whereby description of the program becomes simple.

As shown in an example of a user program in FIG. 11, the program can be described in such a manner that each process to be performed for each generated event is modularized. Apparently, readability of the program is significantly improved compared with that of the known user's program shown in FIG. 20.

Since the detection of events is performed by software, modification, for example, of the following region can be performed simply by modifying following-region-settings, so that flexible processing can be obtained.

When it is determined that the work is not positioned in the following region, a following-motion-suspension event is generated. Therefore, the risk of, for example, the robot 4 continuing the following motion out of the following region can be reliably avoided, if formation of the additional path is made to be suspended corresponding to the following-motion-suspension event. The user can easily design an operational program for avoiding the risk of an error caused by the robot 4 moving outside the operational range due to continuation of the following motion. When a following-motion-suspension event is generated without using the user program, the formation of the additional path can be automatically suspended. In this case, the above-described risks can be avoided automatically and reliably.

The conveyor coordinate system includes the x-axis parallel to the direction of movement of the conveyor 1 and the y-axis in the width direction of the conveyor 1, whereby the position can be easily taught by indicating the position several millimeters upstream or several millimeters in the width direction of the conveyor 1.

In the process, a following path as a target is formed by adding the direct path of the robot 4 toward the designated position and an additional path which depends on the amount of movement of the conveyor 1. Therefore, the following path can be formed with compensation for the movement of the conveyor 1, thus allowing the work to be handled accurately.

Second Embodiment

Figure 13:
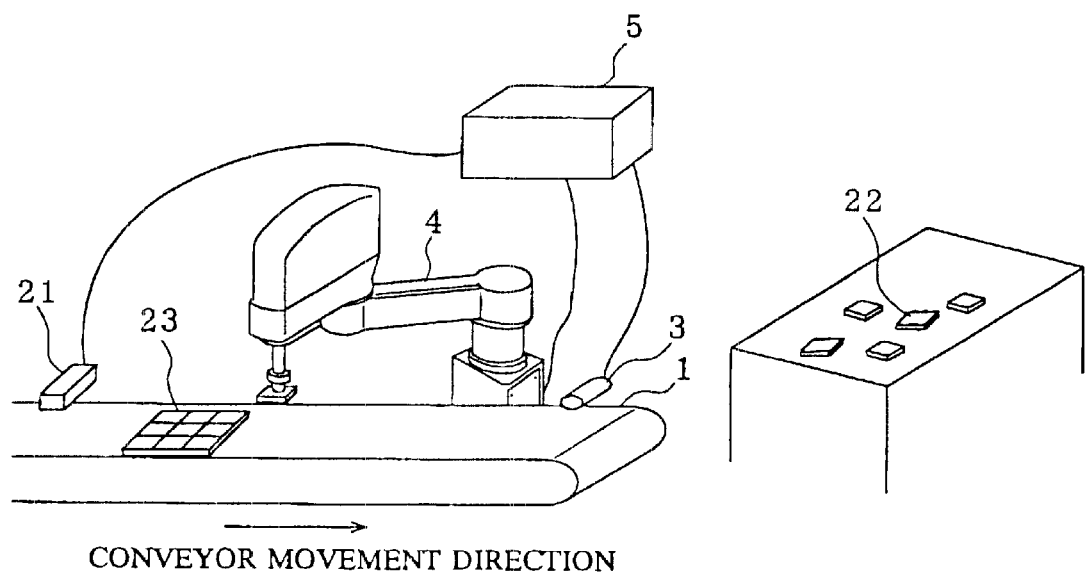
FIG. 13 is an illustration of an outline of a handling system according to a second embodiment of the present invention.

FIG. 13 is an illustration of an outline of a handling system according to a second embodiment of the present invention.

In the handling system according to the second embodiment, a sensor 21 for detecting the arrival of a moving work (a pallet 23) is provided instead of the camera 2 shown in FIG. 3.

Figure 14:
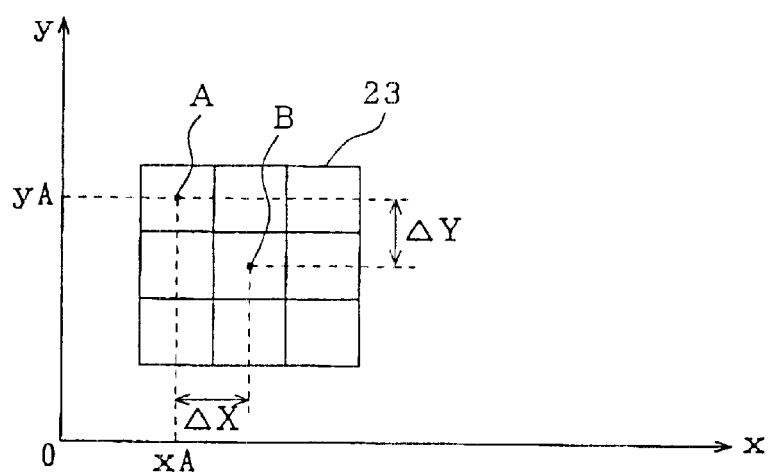
FIG. 14 is an illustration showing the relationship of the position of a work in the handling system according to the second embodiment shown in FIG. 13.

Such a handling system is used when, for example, the work (the pallet 23) on the conveyor is oriented in the width direction of a conveyor 1. In this handling system, for example, when other works 22 put on a table are to be moved onto the pallet 23 which is divided into three-by-three uniform-sized compartments, each compartment of the pallet 23 is designated as the targeted position of the robot tool in a user program. In this case, a conveyor coordinate system is applied and a position A (xA, yA, 0), in a conveyor coordinate system, of the upper left compartment of the pallet 23 shown in FIG. 14 is registered as the current position of the work, whereby a position B, for example, can be designated by indicating the position B as (xA+Δx, yA−Δy, 0) which expresses the position in a form offset from (relative to) the current position A. By using the conveyor coordinate system, the action on the moving work on the conveyor 1 can be easily described. The handling system shown in FIG. 13 can be used for an operation in which two types of parts alternately disposed on a pallet are assembled into one body on the conveyor 1. The handling system according to the second embodiment offers substantially the same effect and advantages as those of the system according to the first embodiment.

Third Embodiment

Figure 15:
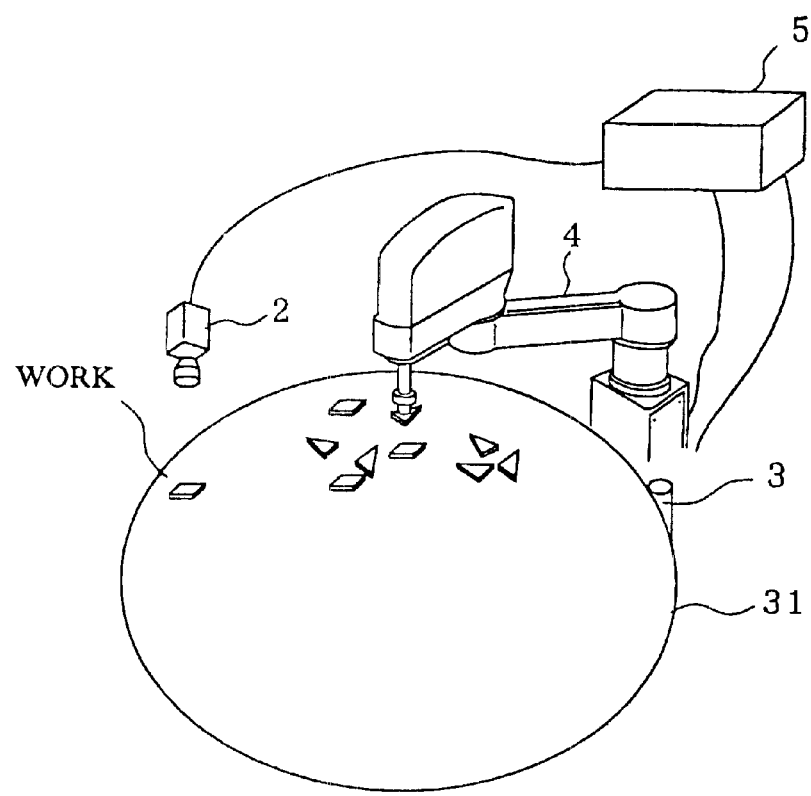
FIG. 15 is an illustration of an outline of a handling system according to a third embodiment of the present invention.
Figure 16:
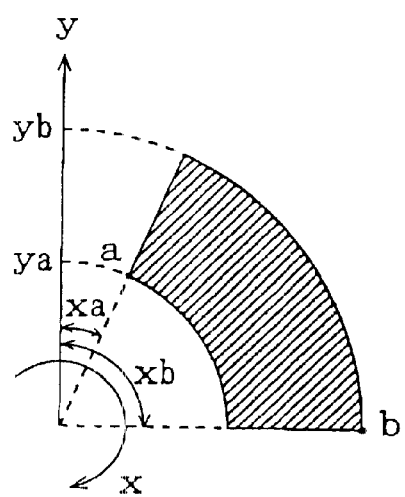
FIG. 16 is an illustration showing a conveyor coordinate system and a following region in the handling system according to the third embodiment shown in FIG. 15.

FIG. 15 is an illustration of an outline of a handling system according to a third embodiment of the present invention. FIG. 16 is an illustration showing a conveyor coordinate system and a following region in the handling system according to the third embodiment.

In the handling system according to the third embodiment, a turntable (including an arc-shaped conveyor) 31 is used instead of the conveyor 1 shown in FIG. 1. When using the turntable 31, a conveyor coordinate system includes the x-coordinate represented by a rotation angle a Z-coordinate represented by an axis of the rotation of the conveyor, and the y-coordinate represented by a distance from the axis of the rotation, as shown in FIG. 16. The coordinate values are indicated by (rotation angle (in degrees), radius (in millimeters), height (in millimeters)). The following-region-setting values of a hatched following region shown in FIG. 16 are represented by a (xa, ya, 0) and b (xb, yb, 0).

When using the turntable 31, only the x-coordinate value of the current position of the work is updated. The handling system according to the third embodiment offers substantially the same effect and advantages as those of the handling system according to the first or second embodiment.

Fourth Embodiment

Figure 17:
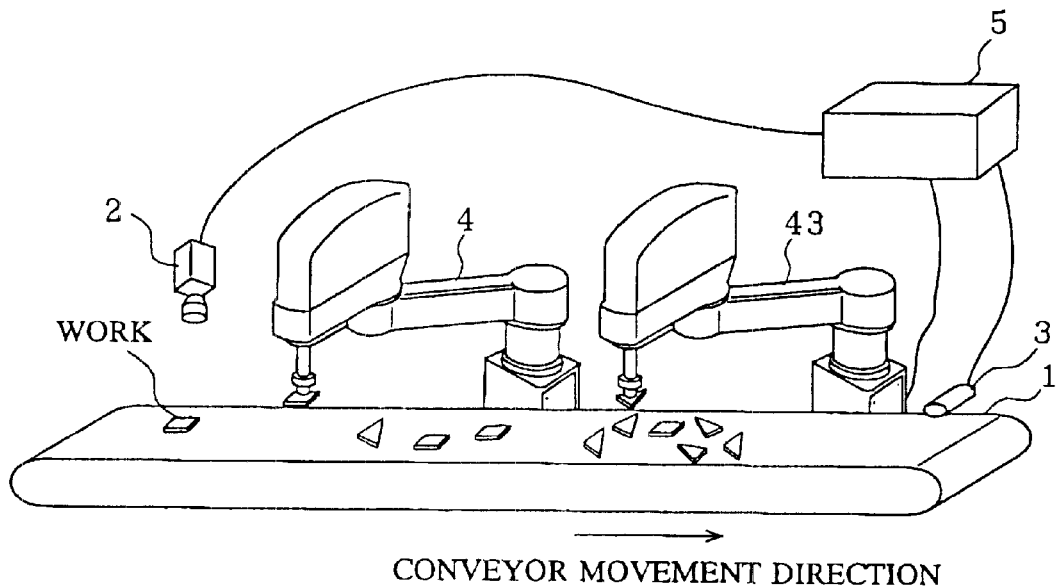
FIG. 17 is an illustration of an outline of a handling system according to a fourth embodiment of the present invention.

FIG. 17 is an illustration of an outline of a handling system according to a fourth embodiment of the present invention.

This handling system uses a plurality of robots for one conveyor. A conveyor coordinate system and a following region are set for each robot.

This handling system performs an operation in such a manner that if a robot 4 failed to pick up a work in a plurality of works flowing at high speed, a robot 43 handles the work, or when two different types of the works flow in a mixed state, the robot 4 handles one type of works and the robot 43 handles the other type of works. The handling system according to the fourth embodiment of the present invention offers substantially the same effect and advantages as those which are offered by the handling system according to the first or second embodiment.

Fifth Embodiment

Figure 18:
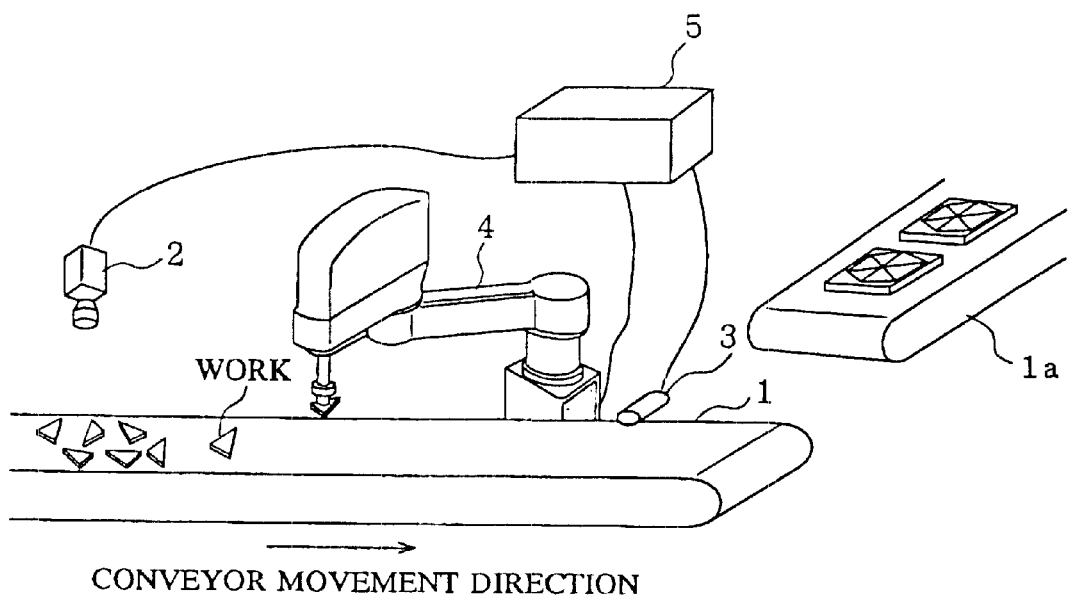
FIG. 18 is an illustration of an outline of a handling system according to a fifth embodiment of the present invention.

FIG. 18 is an illustration of an outline of a handling system according to a fifth embodiment of the present invention. One robot operates for a plurality of conveyors in this handling system. In this case, an operation of moving a work from a conveyor 1 to a conveyor 1a, for example, can be easily programmed, by defining a conveyor coordinate system for each conveyor.

Figure 19A:
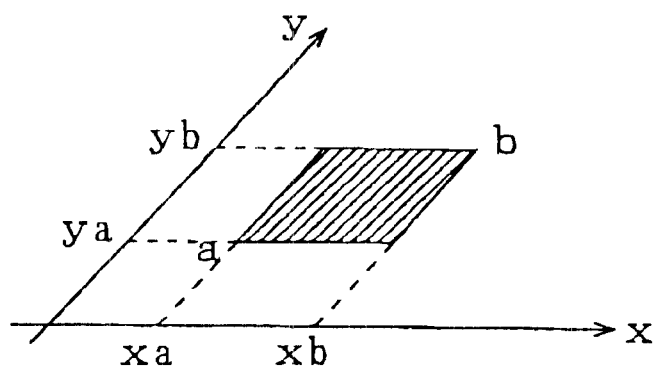
FIGS. 19A and 19B are graphs showing another conveyor coordinate system and a following region.
Figure 19B:
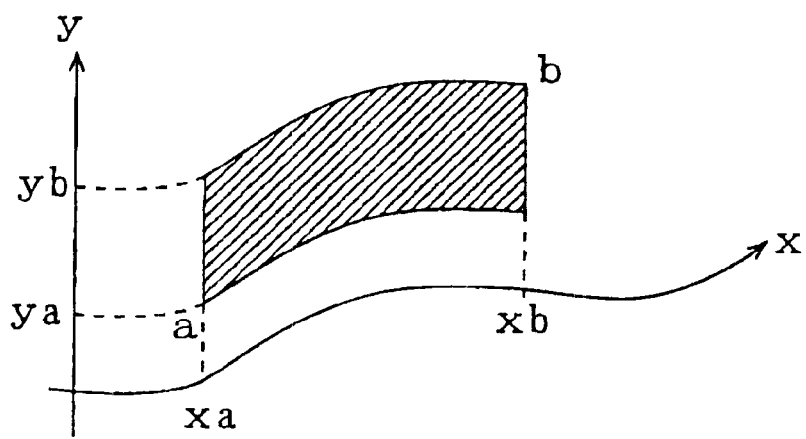
Figure 21:
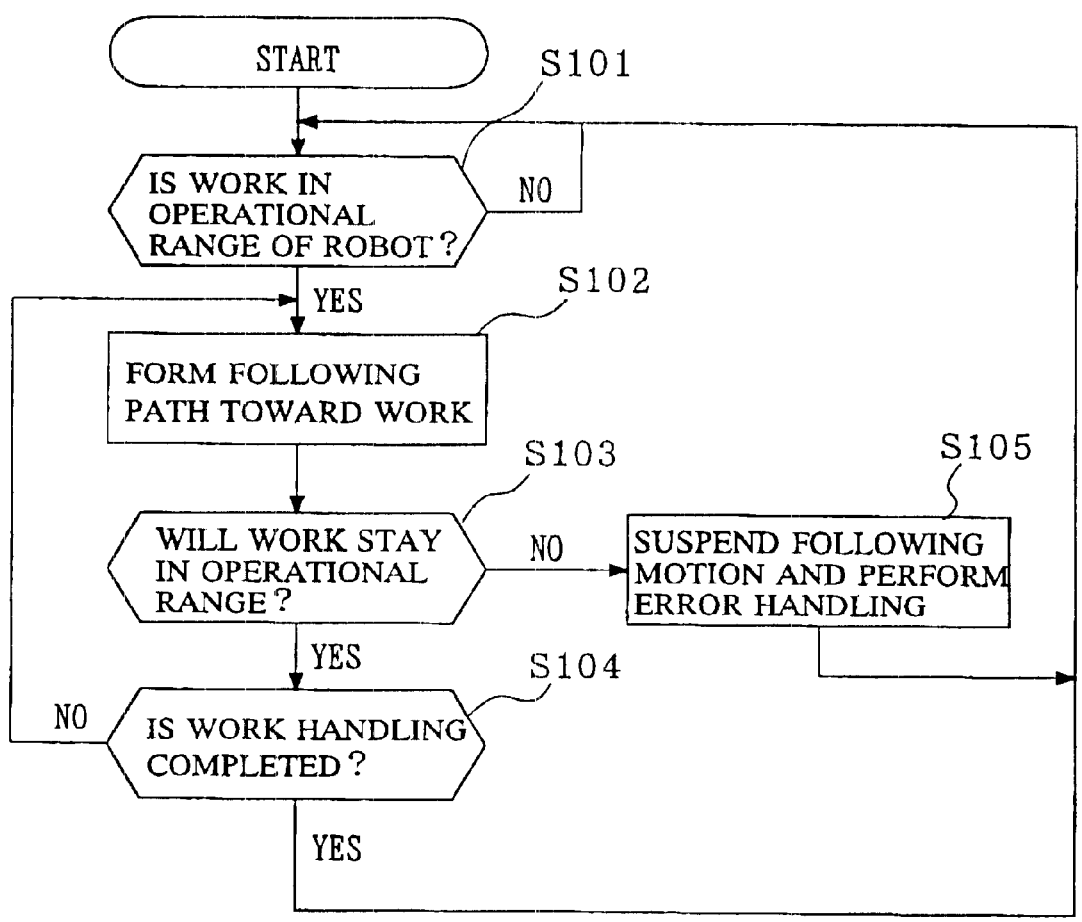
FIG. 21 is a flowchart for executing the program shown in FIG. 20.

Instead of the coordinates systems according to the above-described embodiments, a conveyor system such as an oblique coordinate system shown in FIG. 19A or another coordinate system shown in FIG. 19B may be used according to the present invention. Following regions are shown by hatching in FIGS. 19A and 19B. Following-region-setting values are shown by points a (xa, ya, 0) and b (xb, yb, 0) at opposing corners, as in the rectangular coordinate system shown in FIG. 6.

What is claimed is:

1. A method for controlling a robot which follows a moving object conveyed by a conveyor and which performs a predetermined action on the moving object, the method comprising the steps of:

detecting the moving object;

obtaining a detected position of the moving object in a conveyor coordinate system from the result of the detection;

sequentially updating a current position of the moving object in the conveyor coordinate system on the basis of the detected position of the moving object and the amount of movement of the conveyor;

transforming the current position of the moving object in the conveyor coordinate system to that in a robot coordinate system;

forming a following path for the robot to follow the moving object, on the basis of the transformed position;

determining whether or not designated-position data included in a motion command in a user program to be executed are described in the conveyor coordinate system:

forming a following path for the robot to follow the moving object at a position designated by designated-position data included in the motion command, when it is determined in the determining step that the designated position data are described in the conveyor coordinate system; and making the robot start a following motion along the following path.

2. A method for controlling a robot, according to claim 1, wherein the conveyor coordinate system consists of an x-axis in the movement direction of the moving object, a y-axis which represents, together with the x-axis, a carrying surface of the conveyor, and a z-axis perpendicular to the x-axis and the y-axis.

3. A method for controlling a robot which follows a moving object conveyed by a conveyor and which performs a predetermined action on the moving object, the method comprising the steps of:

detecting the moving object;

obtaining a detected position of the moving object in a conveyor coordinate system from the result of the detection;

sequentially updating a current position of the moving object in the conveyor coordinate system on the basis of the detected position of the moving object and the amount of movement of the conveyor;

transforming the current position of the moving object in the conveyor coordinate system to that in a robot coordinate system;

forming a following oath for the robot to follow the moving object, on the basis of the transformed position;

making the robot start a following motion according to a motion command to follow the moving object at a position designated by designated-position data included in the motion command, provided that the designated position data are set in the conveyor coordinate system;

setting a following region in the conveyor coordinate system;

determining, on the basis of the following-region and a current position of the moving object, whether or not the moving object, is positioned in the following region;

generating a moving-object-arrival event when determining that the moving object is positioned in the following region; and making the robot start a following motion according to a motion command to follow the moving object at a position designated by designated-position data included in the motion command, when the moving-object-arrival event is generated.

4. A method for controlling a robot, according to claim 3, wherein it is determined at a given frequency whether or not the moving object is positioned in the following region.

5. A method for controlling a robot, according to claim 4, wherein the following region is defined by two first lines parallel to the movement direction of the moving object and two second lines perpendicular to the first lines, on a carrying surface of the conveyor.

6. A method for controlling a robot, according to claim 5, wherein the following path for the robot to follow the moving object is formed by adding an additional path in the movement direction of the moving object to a direct path of a tool of the robot in a direction toward a starting position, where the moving object is positioned at the start of the following motion, said additional path being obtained by transforming change of the position of the moving object in the conveyor coordinate system to that in the robot coordinate system and further to that in a robot joint-angle coordinate system, said direct path being obtained by transforming positions of the tool of the robot and the moving object at the start of the following motion, respectively in the robot coordinate system and the conveyor coordinate system, to those in the robot joint-angle coordinate system.

7. A method for controlling a robot, according to claim 6, further comprising the steps of:

generating a following-motion-suspension event when it is determined that the moving object is not in the following region; and performing a process in response to the following-motion-suspension event.

8. A method for controlling a robot, according to claim 7, wherein the process in response to the following-motion-suspension event is a process to suspend the formation of the additional path.

9. A method for controlling a robot, according to claim 6, further comprising the steps of:

suspending the formation of the additional path according to a motion command including designated-position data provided that the designated position data are set in the robot coordinate system; and forming the following path consisting of the direct path in a direction toward the position designated by the designated position data.

10. A method for controlling a robot which follows a moving object conveyed by a conveyor and which performs a predetermined action on the moving object, the method comprising the steps of:

detecting the moving object;

obtaining a detected position of the moving object in a conveyor coordinate system from the result of the detection;

sequentially updating a current position of the moving object in the conveyor coordinate system on the basis of the detected position of the moving object and the amount of movement of the conveyor;

transforming the current position of the moving object in the conveyor coordinate system to that in a robot coordinate system;

forming a following path for the robot to follow the moving object, on the basis of the transformed position; and wherein one conveyor coordinate system is provided for each of a plurality of conveyors.

11. A method for controlling a robot which follows a moving object conveyed by a conveyor and which performs a predetermined action on the moving object, the method comprising the steps of:

detecting the moving object;

obtaining a detected position of the moving object in a conveyor coordinate system from the result of the detection;

sequentially updating a current position of the moving object in the conveyor coordinate system on the basis of the detected position of the moving object and the amount of movement of the conveyor;

transforming the current position of the moving object in the conveyor coordinate system to that in a robot coordinate system;

forming a following path for the robot to follow the moving object, on the basis of the transformed position; and wherein the conveyor coordinate system and the following region are provided for each of a plurality of robots.

12. A method for controlling a robot, according to claim 1, wherein the conveyor comprises a straight conveyor.

13. A method for controlling a robot which follows a moving object conveyed by a conveyor and which performs a predetermined action on the moving object, the method comprising the steps of:

detecting the moving object;

obtaining a detected position of the moving object in a conveyor coordinate system from the result of the detection;

sequentially updating a current position of the moving object in the conveyor coordinate system on the basis of the detected position of the moving object and the amount of movement of the conveyor;

transforming the current position of the moving object in the conveyor coordinate system to that in a robot coordinate system;

forming a following oath for the robot to follow the moving object, on the basis of the transformed position; and wherein the conveyor comprises either an arc-shaped conveyor or a turntable, and the coordinate system of said conveyor comprises an x-coordinate represented by a rotation angle, a z-coordinate represented by an axis of the rotation of the conveyor, and a y-coordinate represented by a distance from the axis of the rotation.

14. A robot controller for controlling a robot which follows a moving object conveyed by a conveyor and which performs a predetermined action on the moving object, comprising:

a moving-object-current-position-storing section for storing a current position of the moving object;

a detector for detecting the moving object;

a moving-object-current-position-updating section for obtaining a detected position of the moving object in a conveyor coordinate system from the result of the detection by the detector, computing a current position of the moving object on the basis of the detected position of the moving object and the amount of movement of the conveyor, and updating the moving-object-current-position-storing section with the computed data; and a path-forming section for transforming the current position of the moving object in the conveyor coordinate system stored in the moving-object-current-position-storing section in the conveyor coordinate to that in a robot coordinate system, and forming a following oath for the robot to follow the moving object, on the basis of the transformed position; and wherein the conveyor coordinate system consists of an x-axis in the movement direction of the moving object, a y-axis which represents, together with the x-axis, a carrying surface of the conveyor, and a z-axis perpendicular to the x-axis and the y-axis.

15. A robot controller for controlling a robot which follows a moving object conveyed by a conveyor and which performs a predetermined action on the moving object, comprising:

a moving-object-current-position-storing section for storing a current position of the moving object;

a detector for detecting the moving object;

a moving-object-current-position-updating section for obtaining a detected position of the moving object in a conveyor coordinate system from the result of the detection by the detector, computing a current position of the moving object on the basis of the detected position of the moving object and the amount of movement of the conveyor, and updating the moving-object-current-position-storing section with the computed data;

a path-forming section for transforming the current position of the moving object in the conveyor coordinate system stored in the moving-object-current-position-storing section in the conveyor coordinate to that in a robot coordinate system, and forming a following path for the robot to follow the moving object, on the basis of the transformed position; and a user-program-executing section which executes a user program described with a motion command and which determines whether or not designated-position data included in the motion command are described in the conveyor coordinate system, wherein the path-forming section forms a following path for the robot to follow the moving object at a position designated by the designated-position data included in the motion command, when the user-program-executing section determines that the designated-position data are described in the conveyor coordinate system.

16. A robot controller according to claim 15, further comprising:

a following-region-storing section for storing a following region represented by coordinates in the conveyor coordinate system; and an event-detecting section which determines, on the basis of the current position of the moving object stored in the moving-object-current-position-storing section and the following-region stored in the following-region-storing section, whether or not the moving object is positioned in the following region, which generates a moving-object-arrival event when determining that the moving object is positioned in the following region, and which generates a following-motion-suspension event when determining that the moving object is not positioned in the following region, wherein the path-forming section forms a following path for the robot to follow the moving object at a position designated by the designated-position data included in the motion command when the moving-object-arrival event is generated.

17. A robot controller according to claim 16, wherein the event-detecting section determines at given intervals whether or not the moving object is positioned in the following region.

18. A robot controller according to claim 16, wherein the following region is defined by two first lines parallel to the movement direction of the moving object and two second lines perpendicular to the first lines, on a carrying surface of the conveyor.

19. A robot controller according to claim 16, wherein the path-forming section forms the following path for the robot to follow the moving object by adding an additional path in the movement direction of the moving object to a direct path of a tool of the robot in a direction toward a starting position, where the moving object is positioned at the start of the following motion, said additional path being obtained by transforming change of the position of the moving object in the conveyor coordinate system to that in the robot coordinate system and further to that in a robot joint-angle coordinate system, said direct path being obtained by transforming positions of the tool of the robot and the moving object at the start of the following motion, respectively in the robot coordinate system and the conveyor coordinate system, to those in the robot joint-angle coordinate system.

20. A robot controller according to claim 19, wherein the user-program-executing section starts performing a process in response to the following-motion-suspension event when the event-detecting section generates the following-motion-suspension event.

21. A robot controller according to claim 20, wherein the process in response to the following-motion-suspension event is a process to suspend the formation of the additional path.

22. A robot controller according to claim 19, wherein the path-forming section suspends the formation of the additional path and forms the following path consisting of the direct path in a direction toward the position designated by the designated position data, when the user-program-executing section determines that the designated-position data included in the motion command are set in the robot coordinate system.

23. A robot controller for controlling a robot which follows a moving object conveyed by a conveyor and which performs a predetermined action on the moving object, comprising:

a moving-object-current-position-storing section for storing a current position of the moving object;

a detector for detecting the moving object;

a moving-object-current-position-updating section for obtaining a detected position of the moving object in a conveyor coordinate system from the result of the detection by the detector, computing a current position of the moving object on the basis of the detected position of the moving object and the amount of movement of the conveyor, and updating the moving-object-current-position-storing section with the computed data;

a path-forming section for transforming the current position of the moving object in the conveyor coordinate system stored in the moving-object-current-position-storing section in the conveyor coordinate to that in a robot coordinate system, and forming a following oath for the robot to follow the moving object, on the basis of the transformed position; and wherein one conveyor coordinate system is provided for each of a plurality of conveyors.

24. A robot controller for controlling a robot which follows a moving object conveyed by a conveyor and which performs a predetermined action on the moving object, comprising:

a moving-object-current-position-storing section for storing a current position of the moving object;

a detector for detecting the moving object;

a moving-object-current-position-updating section for obtaining a detected position of the moving object in a conveyor coordinate system from the result of the detection by the detector, computing a current position of the moving object on the basis of the detected position of the moving object and the amount of movement of the conveyor, and updating the moving-object-current-position-storing section with the computed data;

a path-forming section for transforming the current position of the moving object in the conveyor coordinate system stored in the moving-object-current-position-storing section in the conveyor coordinate to that in a robot coordinate system, and forming a following path for the robot to follow the moving object, on the basis of the transformed position; and wherein the conveyor coordinate system and the following region are provided for each of a plurality of robots.

25. A robot controller according to claim 14, wherein the conveyor comprises a straight conveyor.

26. A robot controller for controlling a robot which follows a moving object conveyed by a conveyor and which performs a predetermined action on the moving object, comprising:

a moving-object-current-position-storing section for storing a current position of the moving object;

a detector for detecting the moving object;

a moving-object-current-position-up dating section for obtaining a detected position of the moving object in a conveyor coordinate system from the result of the detection by the detector, computing a current position of the moving object on the basis of the detected position of the moving object and the amount of movement of the conveyor, and updating the moving-object-current-position-storing section with the computed data;

a path-forming section for transforming the current position of the moving object in the conveyor coordinate system stored in the moving-object-current-position-storing section in the conveyor coordinate to that in a robot coordinate system, and forming a following path for the robot to follow the moving object, on the basis of the transformed position; and wherein the conveyor comprises either an arc-shaped conveyor or a turntable, and the coordinate system of said conveyor comprises an x-coordinate represented by a rotation angle, a z-coordinate represented by an axis of the rotation of the conveyor, and a y-coordinate represented by a distance from the axis of the rotation.

* * * * *

UNITED STATES PATENT AND TRADEMARK OFFICE
CERTIFICATE OF CORRECTION

PATENT NO.   : 6,646,404 B2
DATED        : November 11, 2003
INVENTOR(S)  : Masayuki Okuyama et al.

It is certified that error appears in the above-identified patent and that said Letters Patent is hereby corrected as shown below:

<u>Column 21,</u>
Line 28, please delete "oath" and insert -- path -- and

<u>Column 23,</u>
Line 17, please delete "oath" and insert -- path --

Signed and Sealed this

Thirteenth Day of April, 2004

JON W. DUDAS
*Acting Director of the United States Patent and Trademark Office*